(12) United States Patent
Park

(10) Patent No.: US 7,401,218 B2
(45) Date of Patent: Jul. 15, 2008

(54) HOME DEVICE AUTHENTICATION SYSTEM AND METHOD

(75) Inventor: Sang-do Park, Seoul (KR)

(73) Assignee: Samsung Electornics Co., Ltd., Suwon (KR)

( * ) Notice: Subject to any disclaimer, the term of this patent is extended or adjusted under 35 U.S.C. 154(b) by 843 days.

(21) Appl. No.: 10/821,958

(22) Filed: Apr. 12, 2004

(65) Prior Publication Data

US 2004/0205335 A1  Oct. 14, 2004

(30) Foreign Application Priority Data

Apr. 11, 2003  (KR)  .................. 10-2003-0022981

(51) Int. Cl.
| | |
|---|---|
| H04L 9/00 | (2006.01) |
| G06F 15/16 | (2006.01) |
| G06F 17/30 | (2006.01) |
| G06F 7/04 | (2006.01) |
| G06K 9/00 | (2006.01) |
| H04L 9/32 | (2006.01) |

(52) U.S. Cl. .................. 713/155; 713/153; 713/156; 713/173; 713/175; 713/176; 726/10; 726/27

(58) Field of Classification Search .................. 713/153, 713/156, 173, 175, 176; 726/10, 27
See application file for complete search history.

(56) References Cited

U.S. PATENT DOCUMENTS 6,131,120 A * 10/2000 Reid .................. 709/225
6,185,688 B1 * 2/2001 Greaves et al. .................. 726/36
6,751,729 B1 * 6/2004 Giniger et al. .................. 713/153
6,826,690 B1 * 11/2004 Hind et al. .................. 713/186
6,938,154 B1 * 8/2005 Berson et al. .................. 713/156
2001/0048744 A1 * 12/2001 Kimura .................. 380/247
2002/0116637 A1   8/2002 Deitsch et al.
2003/0021413 A1 * 1/2003 Kiiveri et al. .................. 380/247
2003/0126243 A1 * 7/2003 Kudo et al. .................. 709/222

FOREIGN PATENT DOCUMENTS

| | | |
|---|---|---|
| EP | 1 420 565 A1 | 5/2004 |
| JP | 2001-256191 A | 9/2001 |
| JP | 2004-15530 A | 1/2004 |
| WO | WO 02/102016 A2 | 12/2002 |

OTHER PUBLICATIONS

Pittsley, Neil et al. "Security Issues in Networked Appliances and Home Gateways", IEEE 2002.*

* cited by examiner

Primary Examiner—Kambiz Zand
Assistant Examiner—Michael J. Simitoski
(74) Attorney, Agent, or Firm—Sughrue Mion, PLLC

(57) ABSTRACT

A home device authentication system and method, wherein the home device authentication system includes one or more home devices each having device information including coding information for authentication and information on a service provider providing authentication services; and a home gateway including decoding information corresponding to the coding information of the home devices, and for authenticating the home devices by using the decoding information. Further, if there exists no decoding information in the home gateway, the home gateway requests the decoding information from the service provider. Accordingly, privacy and security for the home network is secured.

19 Claims, 6 Drawing Sheets

FIG. 3

DEVICE INFORMATION (DI)

I1 — DEVICE CATEGORY : COLOR TV
SERIAL NUMBER : SAIT 2004
COMPANY : SAMSUNG ELECTRONICS
MODEL : SVP-42W5HD

I2 — CONFIRM SITE : WWW.SEC.CO.KR

I3 — HASH ALGORITHM : SHA-160
SIGNATURE

HOME DEVICE AUTHENTICATION SYSTEM AND METHOD

This application claims benefit under 35 U.S.C. § 119 from Korean Patent Application No. 2003-22981, filed on Apr. 11, 2003, the entire content of which is incorporated herein by reference.

BACKGROUND OF THE INVENTION

1. Field of the Invention

Apparatuses and methods consistent with the present invention relate to a home network system, and more particularly, to a home device authentication system and a method performing a home device authentication process for home network system security.

2. Description of the Related Art

High-speed access to the Internet, which is possible with x-Digital Subscriber Lines (xDSLs) or cable modems spread over many homes, together with development of the Internet in recent years, have explosively increased access to the Internet from personal home computers.

Users want to do more than merely access the Internet, and many users expect to control and communicate with devices at home through personal computers. On the other hand, home network systems have been developed that enable the users to communicate with home devices and receive new services from outside their homes.

In general, a home network system refers to a network that incorporates home information devices including personal computers into one system to enable communications therebetween. The home network system has rapidly spread together with developments in networking technologies, support software, and information appliances.

Wirings built into homes, such as existing phone lines (Home PNA: Home Phoneline Networking Alliance), electric power outlets (power line LAN), coaxial cables for TV, and so on, are utilized to build such a home network system, and FIG. 1 is a view for conceptually showing such a home network system.

First and second home gateways 110 and 210 are provided in first and second home networks 100 and 200, respectively. Home devices 111, 113, 115, and 117, and home devices 211 and 213 are respectively interconnected to the first and second home gateways 110 and 210 for networking, and connected to external networks through the first and second home gateways 110 and 210.

If a new device is connected to a home network in such a conventional home network, there is no authentication process for the device in general. That is, in the event that a new device 113 is connected to the first home network 100, the new device 113 is physically connected to the first home gateway 110 and transfers connection information, so that the new device 113 is connected to the first home gateway 110. Thus, the conventional home network has a unilateral structure in that only the first home gateway 110 authenticates the new device 113. Therefore, the connection information of the new device 113 is transferred to the second home gateway 210 of the second home network 200 adjacent to the first home network 100, through the wirings such as phone lines, electric power line LAN, TV coaxial cables, and so on. Accordingly, either by accident or on purpose, the home device 113 of the first home network 100 is connected to the second home network, by which the first home network 100 is exposed to the second home network 200.

As described above, the conventional home network has a problem with respect to privacy and security since it has no authentication process for home devices connected thereto.

SUMMARY

The present invention has been devised to solve the above problem, so it is an aspect of the present invention to provide a home device authentication system and a method performing a home device authentication process for home network privacy and security.

In order to achieve the above aspect, a home device authentication system comprises one or more home devices each having device information including coding information for authentication and information on a service provider providing authentication services; and a home gateway including decoding information corresponding to the coding information of the home devices, and for authenticating the home devices by using the decoding information.

The home device authentication system further comprises a service provider providing the decoding information, wherein, if there exists no decoding information in the home gateway, the home gateway requests the decoding information to the service provider.

The home gateway includes an input/output unit for inputting the device information including the coding information and the service provider information; a device process unit for obtaining the decoding information, authenticating the home device by using the decoding information and the coding information, and selecting a display device for displaying a performed authentication result; and an application process unit for generating an authentication request screen requesting to a user whether to approve the authentication result.

The input/output unit outputs the authentication request screen to the selected display device, and the device process unit controls the input/output unit to set or not to set the home devices to the home network based on whether or not the user approves the result through the authentication request screen.

The home gateway further includes a display unit for externally displaying the authentication result; and a user input unit for inputting a selection command with respect to whether a user approves the result in correspondence to the displayed authentication result.

The device process unit controls the input/output unit to set or not to set the home devices to the home network in correspondence to the user's selection command inputted from the user input unit.

The device process unit controls the input/output unit to cut off setting the home devices to the home network if a response signal with respect to a user's approval is not inputted for a predetermined period of time.

The device process unit includes a information detection unit for detecting the coding information and the service provider information inputted from the input/output unit; an authentication process unit for authenticating the home devices by using the decoding information and the coding information, and controlling setting of the home devices to the home network according to whether there is a user's approval in the authentication request screen; a storage for storing information on the home devices connected to the home network and the decoding information corresponding to the coding information for the home devices; and a selection unit for selecting a displayable device for the authentication result performed in the authentication process unit based on information on the home devices that is previously stored.

The authentication process unit stores the home device information into the storage, if the setting of the home devices to the home network is approved according to the user's approval.

In the meantime, a home device authentication method according to the present invention comprising steps of inputting device information including coding information for authenticating home devices and information on a service provider providing authentication services; authenticating the home devices by using previously stored decoding information corresponding to the coding information, and selecting a device capable of displaying an authentication result; and generating an authentication request screen requesting a user's approval with respect to the authentication result.

The home device authentication method further comprises a step of requesting the decoding information to a service provider by using the service provider information, if there exists no decoding information in the home device process step.

The home device authentication method further comprises steps of outputting the generated authentication request screen to the display device; and setting or cutting off the home devices to or from the home network depending upon whether or not the user approves the authentication result through the authentication request screen.

The home device authentication method further comprises steps of externally displaying the authentication result; and inputting a selection command with respect to whether a user approves the result in correspondence to the displayed authentication result.

The step for setting or cutting off the home devices sets or cuts off the home devices to or from the home network in correspondence to the user's selection command inputted from the user input step, and cuts off setting the home devices to the home network if a response signal with respect to a user's approval is not inputted for a predetermined period of time.

The device process step includes steps of detecting the device information including the coding information and the service provider information that are inputted; authenticating the home devices by using the decoding information and the coding information, and controlling setting or cutting-off of the home devices to or from the home network according to whether there is a user's approval in the authentication request screen; and selecting a displayable device for the authentication result performed in the authentication process step based on information on the home devices connected to the home network.

Preferably, but not necessarily, the home device authentication method further comprises a step of storing the information on the home devices if the setting of the home devices to the home network is approved according to the user's approval.

Accordingly, the process for authenticating devices connected to a home network can prevent the devices from being connected by accident or on purpose to different networks. By doing so, the privacy and security for a network system can be secured. Further, even users unfamiliar with home network environments can install and register home devices in a more convenient manner.

BRIEF DESCRIPTION OF THE DRAWINGS

The invention will be described in detail with reference to the following drawings in which like reference numerals refer to like elements, and wherein:

FIG. 3 is an exemplary view for showing device information (DI) included in a device 311 according to an exemplary embodiment of the present invention;

DETAILED DESCRIPTION OF THE EXEMPLARY EMBODIMENTS

Hereinafter, the present invention will be described in detail with reference to the accompanying drawings.

Figure 1:
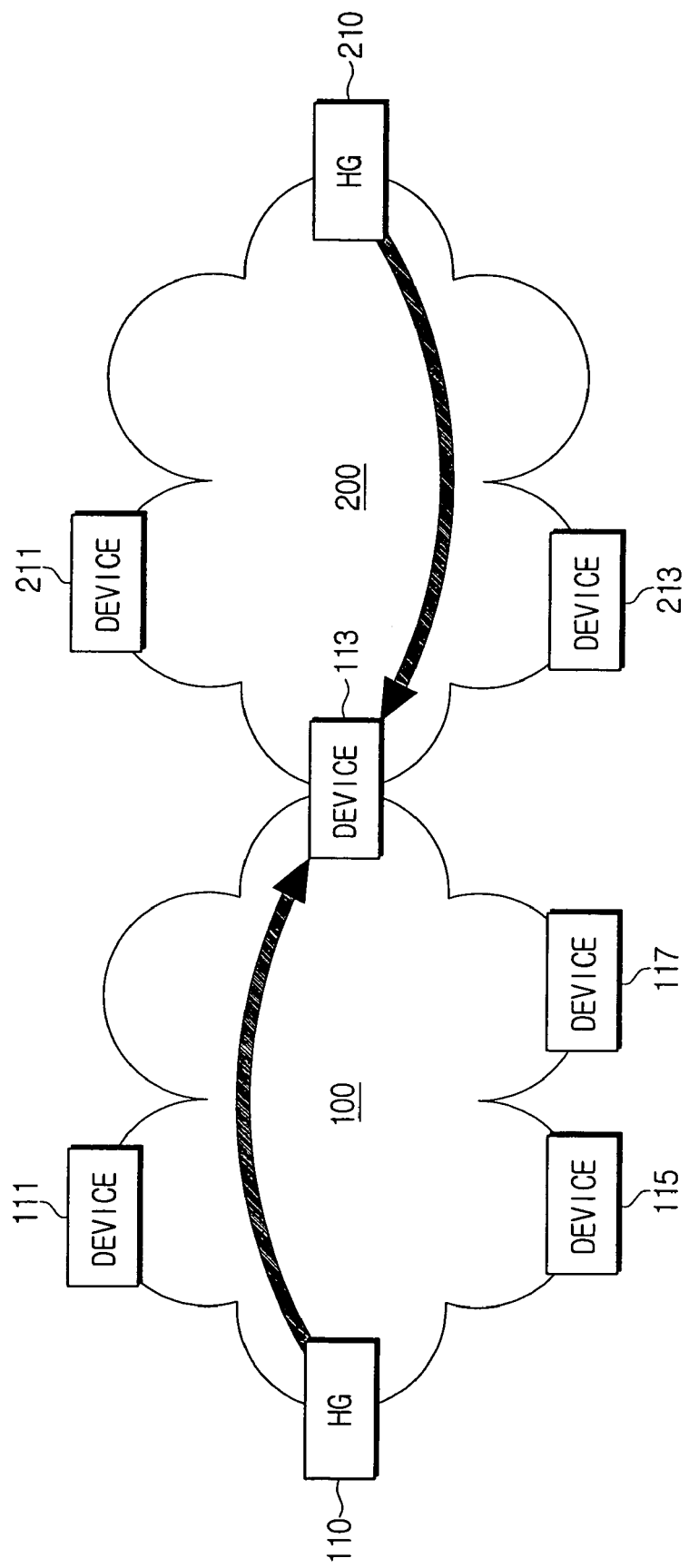
FIG. 1 is a conceptual view for showing a conventional general home network system.
Figure 2:
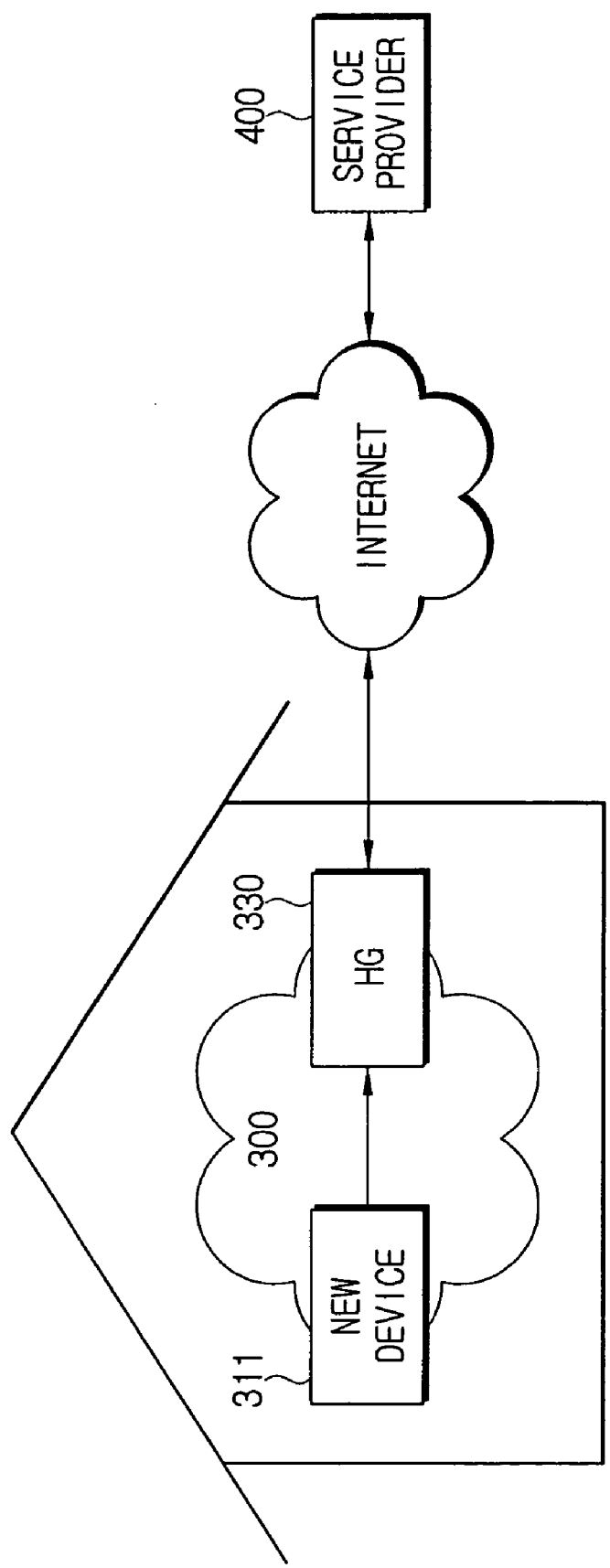
FIG. 2 is a schematic view for showing a structure of a home device authentication system according to an exemplary embodiment of the present invention.

FIG. 2 is a conceptual view for explaining a home device authentication system according to an exemplary embodiment of the present invention.

A home device authentication system has a home device 311 newly connected to a home network 300, a home gateway 330 performing a server function for the home network 300, and a service provider 400 providing predetermined coding information for authenticating the new device 311.

First, the home device 311 according to the present invention has device information (DI) as shown in FIG. 3. The device information (DI) includes at least general device specification information (I), service provider information (12) for providing device authentication services, and predetermined coding information (13) for performing a device authentication process.

Figure 4:
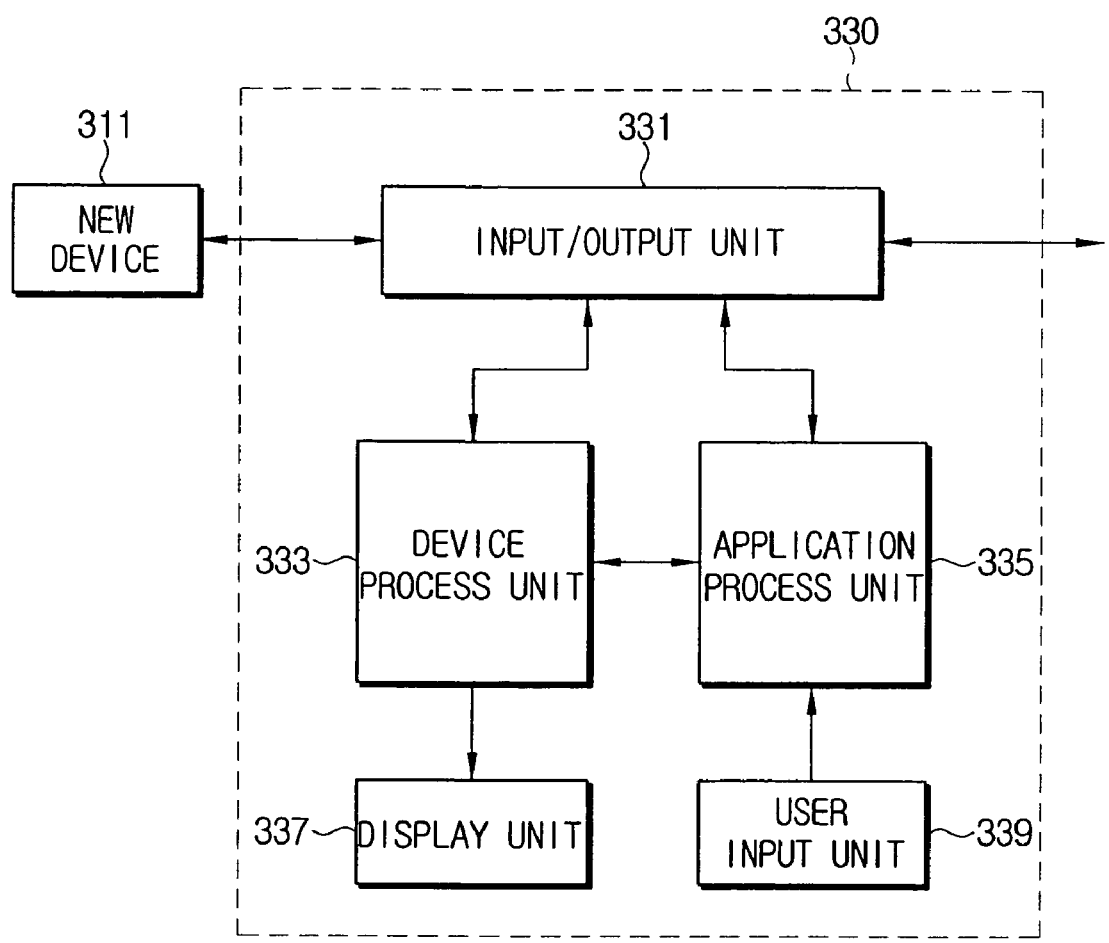
FIG. 4 is a detailed block diagram for showing a home gateway 330 according to an exemplary embodiment of the present invention.

The home gateway 330, as shown in FIG. 4, has an input/output unit 331 connected with a home device of a home network through various wired and/or wireless manners and for inputting and outputting data based on a network protocol such as the Dynamic Host configuration Protocol (DHCP), a device process unit 333 for authenticating the new device 311, an application process unit 335 for applying an application program for providing device authentication services, a display unit 337, such as LED, for notifying users of information corresponding to authentication results, a user input unit 339, such as an operation panel, for inputting user's operation commands, and so on.

The service provider 400 provides to the home gateway 330 predetermined coding information corresponding to the new device 311 requested from the home gateway 330 in order to authenticate the new device 311 connected to the home gateway 330.

Figure 5:
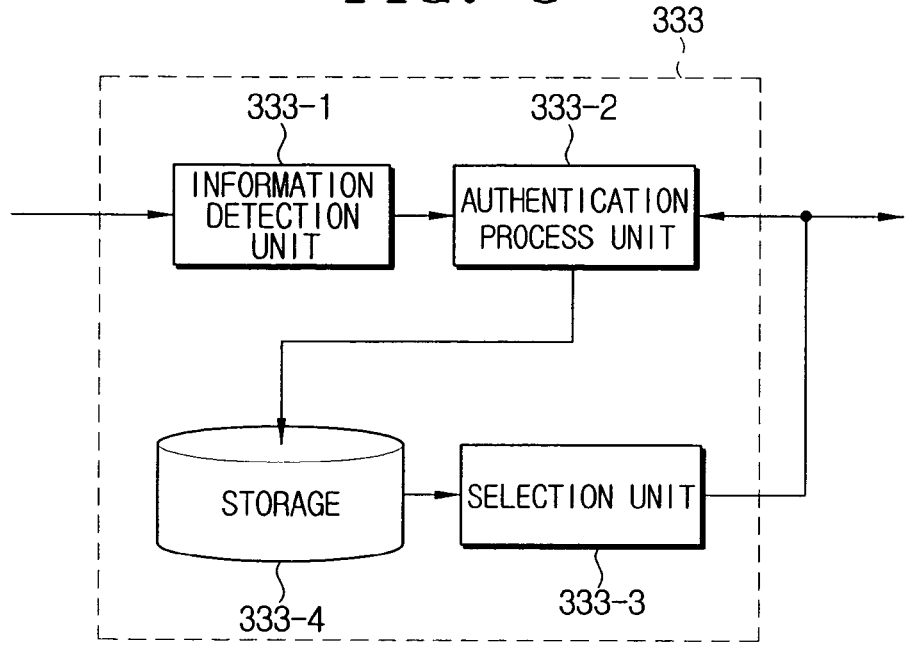
FIG. 5 is a detailed block diagram for showing a device processor 333 for a home gateway 330 according to an exemplary embodiment of the present invention.

FIG. 5 is a detailed block diagram for showing the device process unit 333 of the home gateway 330 according to an exemplary embodiment of the present invention, and the operations of the device process unit 333 are described in detail with reference to FIG. 4 and FIG. 5.

The device process unit 333 includes at least, an information detection unit 333-1, a storage 333-4, an authentication process unit 333-2, and a selection unit 333-3.

The information detection unit 333-1, if the new device 311 is physically connected to a home network, recognizes a newly connected device based on information of the new device 311 that is inputted from the input/output unit 331, and detects the inputted device information DI as shown in FIG. 3.

The storage 333-4 stores information and the like with respect to home devices connected to the home gateway 330, and, further, has decoding information corresponding to the coding information on individual home devices. In general, the kind of decoding information is provided by the home device manufacturer.

The authentication process unit 333-2 authenticates the new device 311 by using a predetermined authentication algorithm. That is, the authentication process unit 333-2 performs an authentication process for the new device 311 by using information provided for authentication from the device information DI of the new device 311. For example, the information includes the service provider information 12 and the coding information 13 from the device information DI shown in FIG. 3.

Descriptions will be made on an authentication process by using the public key algorithm and the hash algorithm, for example, as authentication algorithms.

First, the authentication process unit 333-2 checks for a public key of the decoding information previously stored in the storage 333-4 based on the manufacturer's general device specification information 11 from the device information DI of the new device 311. That is, the authentication process unit 333-2 checks whether there exists a public key of the decoding information corresponding to a signature of coding information 13 of the new device 311.

If there exists a public key corresponding to the signature of the new device 311 in the storage 333-4, the authentication process unit 333-2 decodes the signature by using the public key.

Here, the signature is an obtained hash value that is coded using a private key, wherein a predetermined message is shortened into a hash and a hash value is obtained from the hash. That is, the authentication process unit 333-2 decodes the signature of private key using a public key, to thereby recover an original hash value. Accordingly, the authentication process unit 333-2 obtains a hash value for a message, compares the obtained hash value with a recovered original hash value, and decides whether the message is normal or not.

In the meantime, if there exists no decoding information corresponding to a signature of coding information 13 on the new device 311 as a result of the check on the decoding information previously stored in the storage 333-4, the authentication process unit 333-2 requests a public key of the device to a service provider, using the service provider information 12 from the inputted device information DI. The authentication process unit 333-2, if the public key is provided from the service provider, decodes the signature of the coding information 13 using the public key.

The selection unit 333-3 searches for information on individual home network devices that is stored in the storage 333-4 and selects an optimum display device that can display an authentication request screen to be described later. Preferably, but not necessarily, the selection unit 333-3 selects a displayable device that is used most recently.

Figure 6:
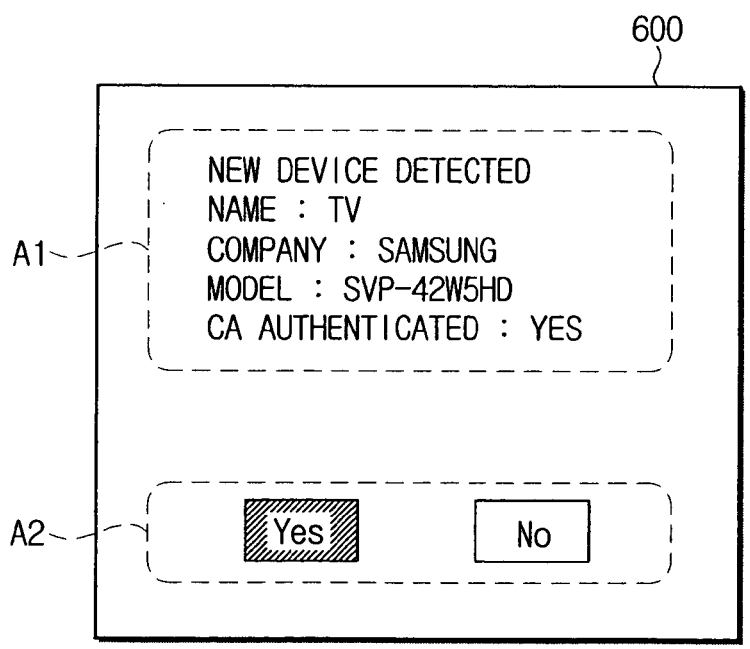
FIG. 6 is an exemplary view for showing an authentication request screen 600 for a new device according to an exemplary embodiment of the present invention.

As stated above, to the application process unit 335 of the home gateway 330 is provided the authentication result processed in the authentication process unit 333-2 and information on the displayable device selected from the selection unit 333-3. The application process unit 335 generates an authentication request screen 600, as shown in FIG. 6, having a portion A1 for displaying the authentication result to a user and a portion A2 for requesting device authentication. The authentication request screen 600 generated as above is transferred to a selected display device, and a user decides whether to authenticate the new device 311 through the authentication request screen 600 displayed.

If a current home network does not have a device capable of displaying the authentication request screen 600, it is decided whether to authenticate the new device through the display unit 337, such as, for example, LED, and the user input unit 339 of the home gateway 330.

For example, the display unit 337 notifies a user of the authentication result by turning on a blue LED if the authentication process unit 333-2 authenticates as an authorized device the device 311 newly connected to the home gateway 330, and, to the contrary, by turning on a red LED if the new device 331 is an alien device that is unauthorized as a result of the authentication result therefor. Accordingly, the user decides whether to authenticate the new device through the user input unit 339.

As above, it is decided whether or not the new device 311 is set to a home network based on whether a user authenticates the new device 311 or not, so privacy or security is secured for the home network, and, further, servicing users for home device installation and registration can promote convenience in use. When the device is set to the network, the device remains connected to the network.

Figure 7:
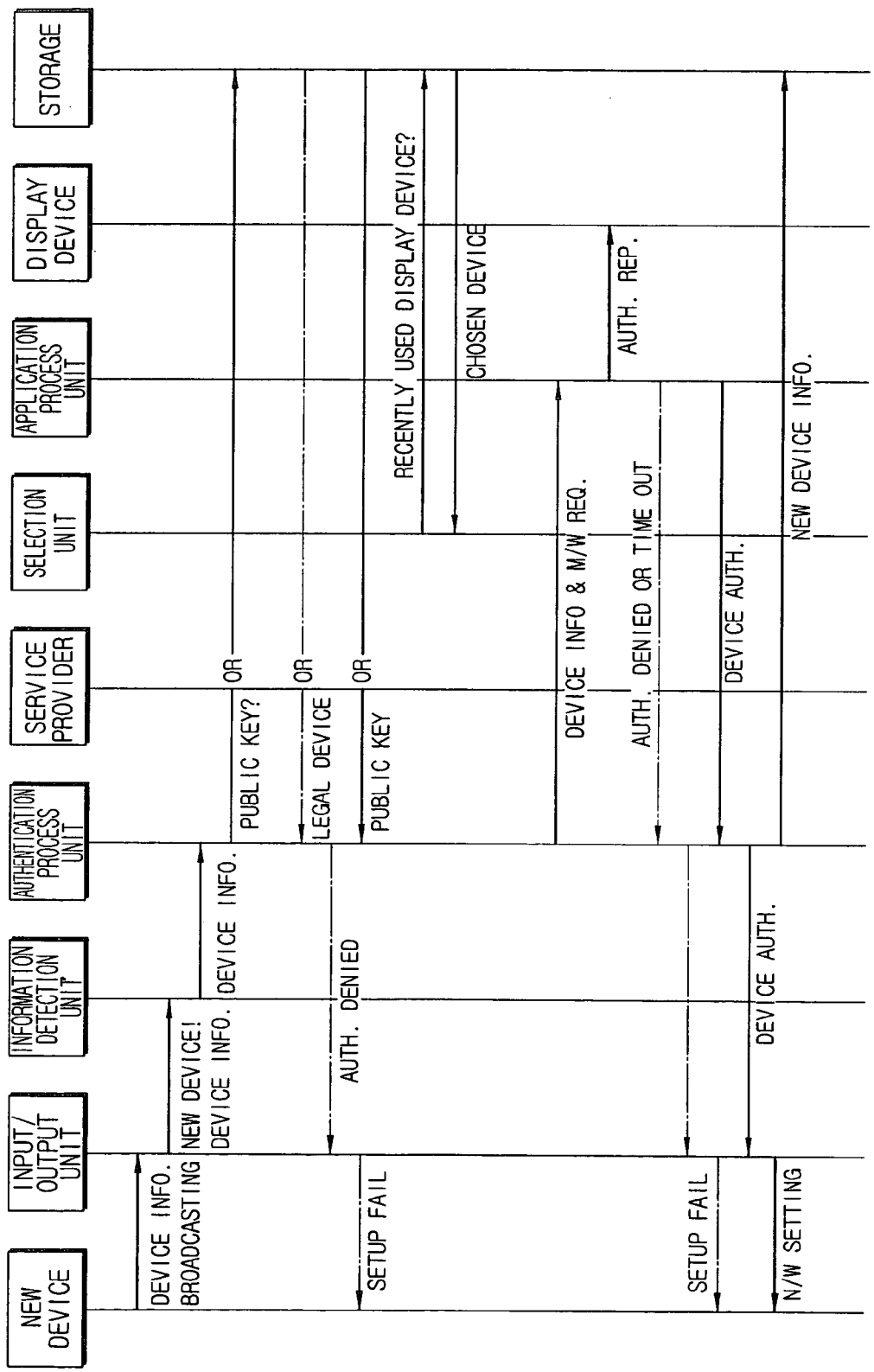
FIG. 7 is a view for showing a flow chart for a home device authentication process according to an exemplary embodiment of the present invention.

Hereinafter, detailed descriptions are made on an authentication process for a home device newly connected to a home network with reference to FIG. 7 showing a flow chart for a home device authentication process.

First, the new device 311 is physically connected to the home gateway 330, and, at this time, the device information DI provided from a new device manufacturer is transferred to the input/output unit 331 in a DHCP broadcast message format.

The information detection unit 333-1 recognizes a connection of the new device 311 based on the device information DI of the new device 311 that is inputted to the input/output unit 331 of the home gateway 330, and detects the device information (device information DI illustrated in FIG. 3).

The device information DI detected from the information detection unit 333-1 is transferred to the authentication process unit 333-2.

The authentication process unit 333-2 authenticates the new device using the device information DI.

First, it is checked whether there exists a public key of the decoding information corresponding to a signature of coding information 13 of the new device 311 from the decoding information previously stored in the storage 333-4. If there exists in the storage 333-4, the public key corresponding to the signature of the new device 311 as a result of the check, the signature is decoded by using the public key.

In the meantime, if the decoding information does not exist, the service provider information 12 is used to request the public key from a service provider. The authentication process unit 333-2 uses the provided public key to decode the signature of coding information 13, and decides whether it is authorized device information.

Further, if a device is not registered or device information is different from information provided from the service provider at the beginning in a process for obtaining a public key from the storage 333-4 and the service provider, it is decided that the device is not an authorized device, so it can be cut off from a network.

The selection unit 333-3 selects an optimum display device, for example, a display device used most recently that can display the authentication request screen 600 based on home network device information stored in the storage 333-4.

To the application process unit 335 is transferred the authentication result processed in the authentication process unit 333-2 and display device information selected in the selection unit 333-3, and the application process unit 335 generates the authentication request screen 600 as shown in FIG. 6. The authentication request display 600 is displayed on a selected display device, and it is decided by a user whether to authenticate the new device.

The user decides the authentication for a device based on device information including the authentication result displayed on the authentication request screen 600. For example, if it is decided as the authentication result that the new device 311 is an authorized and normal device, a user selects 'YES' to authenticate the new device 311 to be set to a network. The authentication signal 'YES' is transferred to the application process unit 335 of the home gateway 330, and the application process unit 335 transfers to the authentication process unit 333-2 a registration signal for the new device 311 corresponding to the authentication signal 'YES'. Accordingly, the authentication process unit 333-2 stores the device information of the new device 311 into the storage 333-4, and controls the input/output unit 331 to proceed with network setting for the new device 311.

In the meantime, if it is decided as the authentication result for the new device 311 that the new device 311 is an unauthorized and abnormal device, the user selects 'NO' to prevent the new device 311 from being set to a network. Further, if there is no response signal from a user with respect to the authentication for a predetermined period of time, the network setting for the new device 311 is automatically cut off.

If a rejection signal 'NO' is inputted to reject the authentication or there is no response signal from a user for a predetermined period of time, the application process unit 335 transfers to the authentication process unit 333-2 an authentication rejection signal with respect to the new device 311. The authentication process unit 333-2 controls the input/output unit 331 not to set the new device 311 to a network.

In the home device authentication system as above, a new device undergoes an authentication process by means of a predetermined coding algorithm during the registration to a home network, and then it is decided whether the new device is registered to a network based on whether a user authenticates the device. Accordingly, privacy and security for a home network can be secured.

First, the present invention performs an authentication process for a device connected to a home network, so it can prevent a device of a different network from being connected to the home network by accident or on purpose. By doing so, the privacy and security for a network system can be secured.

Second, a user unfamiliar with home network environments can install and/or register a home device in a more convenient manner.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device authentication system, comprising:
   a device having device information including coding information for authentication and information on a service provider providing authentication services; and
   a gateway including decoding information corresponding to the coding information of the device, authenticating the device by using the decoding information to produce an authentication result on the device,
   the gateway comprising a selecting unit for selecting a display for the authentication result based on the device information on the device that is previously stored.

2. The device authentication system of claim 1, wherein the service provider provides the decoding information, and wherein, if there exists no decoding information in the gateway, the gateway requests the decoding information from the service provider.

3. The device authentication system of claim 1, the gateway further comprising:
   an input/output unit into which the device information including the coding information and the information on the service provider is input;
   a device process unit for obtaining the decoding information, authenticating the device by using the decoding information and the coding information, and selecting a display for displaying an authentication result; and
   an application process unit for generating an authentication request screen requesting a user to approve or to reject the authentication result.

4. The device authentication system of claim 3, wherein the input/output unit outputs the authentication request screen to the display, and the device process unit controls the input/output unit to set or not to set the device to a network based on a response of the user to the authentication result through the authentication request screen.

5. The device authentication system as claimed in claim 3, wherein the display externally displays the authentication result, the device authentication system further comprising:
   a user input unit for inputting a selection command of the user in a response to the authentication result.

6. The device authentication system of claim 5, wherein the device process unit controls the input/output unit to set or not to set the device to a network in correspondence to the selection command inputted from the user input unit.

7. The device authentication system of claim 3, wherein the device process unit controls the input/output unit to cut off the device from a network if the user's approval is not inputted for a predetermined period of time.

8. The device authentication system of claim 3, wherein the device process unit includes:
   an information detection unit for detecting the coding information and the information on the service provider inputted from the input/output unit;
   an authentication process unit for authenticating the device by using the decoding information and the coding information, and controlling a setting of the device to a network according to a user's response to the authentication request screen; and
   a storage for storing the device information on the device connected to the network and the decoding information corresponding to the coding information for the device.

9. The device authentication system of claim 8, wherein, if the setting of the device to the network is approved according to the user's response, the authentication process unit stores the device information into the storage.

10. The device authentication system of claim 1, wherein the device is a home device, the gateway is part of a home network.

11. A device authentication method comprising:
    inputting device information including coding information for authenticating a device and information on a service provider providing authentication services;

authenticating the device by using previously stored decoding information corresponding to the coding information, and selecting a display capable of displaying an authentication result;

generating an authentication request screen requesting a user's approval with respect to the authentication result; and selecting a display for the authentication result based on device information of a device connected to a network.

12. The device authentication method of claim 11, further comprising requesting the decoding information from the service provider by using the information on the service provider, if there exists no previously stored decoding information corresponding to the coding information during the authenticating the device operation.

13. The device authentication method of claim 11, further comprising:

outputting the authentication request screen to the display; and setting the device to or cutting off the device from the network depending upon a response of the user to the authentication result through authentication request screen.

14. The device authentication method of claim 13, wherein the operation of setting the device to or cutting off the device from the network cuts off the device from the network if the user's approval is not inputted for a predetermined period of time.

15. The device authentication method of claim 11, further comprising:

externally displaying the authentication result; and inputting a selection command of the user in a response to the authentication result in correspondence to the displayed authentication result.

16. The device authentication method of claim 15, wherein the device is set to or cut off from the network in correspondence to the selection command of the user in the inputting the selection command operation.

17. The device authentication method of claim 11 further comprising:

detecting the device information including the coding information and the information on the service provider that are inputted; and authenticating the device by using the decoding information and the coding information, and controlling a setting of the device to or cutting off the device from the network according to the user's response in the authentication request screen.

18. The device authentication method of claim 17 further comprising storing the device information if the setting of the devices to the network is approved according to the user's response.

19. The device authentication method of claim 11, wherein the device is a home device and the network is a home network.

* * * * *